T. Muzzy,
Saw-Set,
Nº 6,112. Patented Feb. 13, 1849.
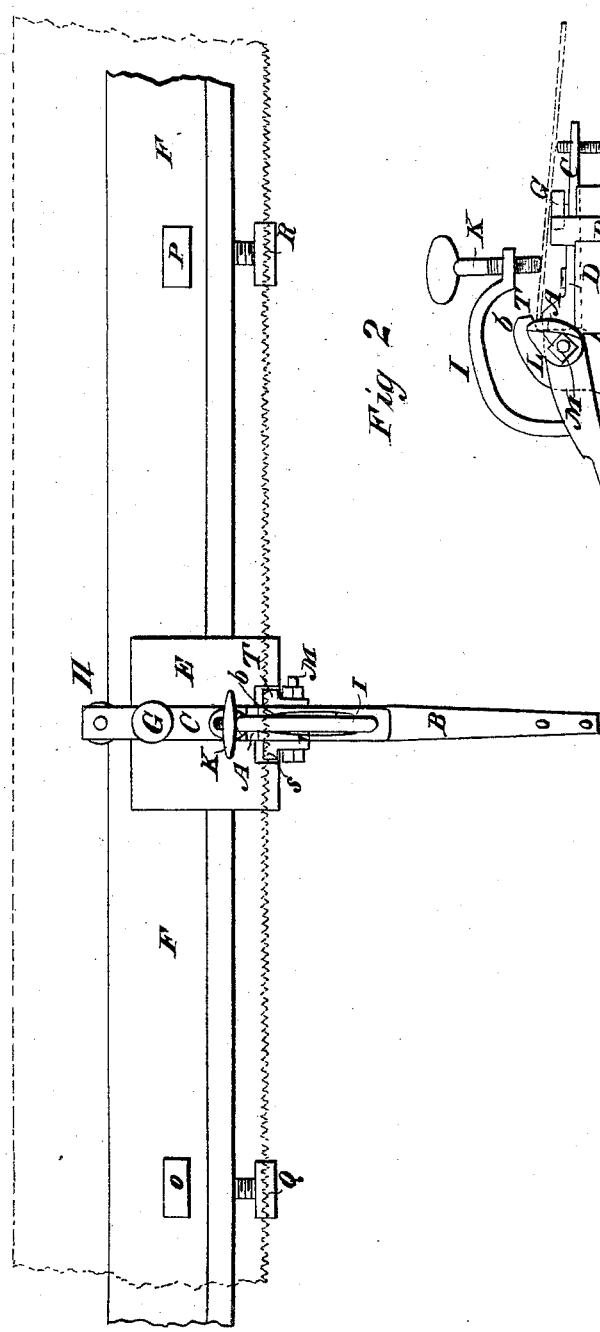
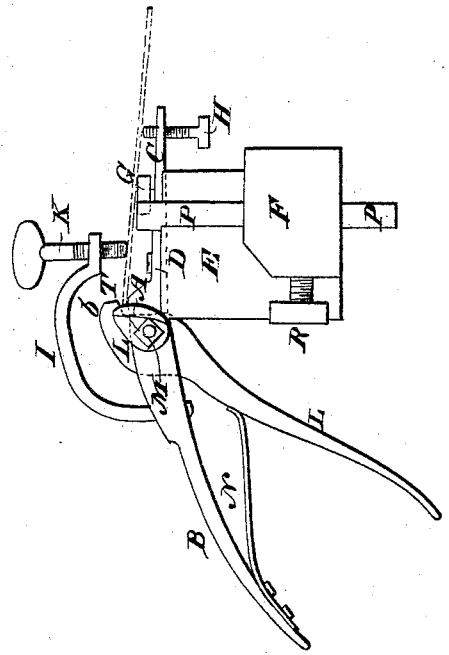

UNITED STATES PATENT OFFICE.

JACOB MUZZY, OF EDDINGTON, MAINE.

NIPPER SAW-SET.

Specification of Letters Patent No. 6,112, dated February 13, 1849.

*To all whom it may concern:*

Be it known that I, JACOB MUZZY, of Eddington, in the county of Penobscot and State of Maine, have invented a new and useful Improvement in the Saw-Set; and I do hereby declare that the same is fully described and represented in the following specification and accompanying drawings, letters, figures, and references thereof.

Of the said drawings Figure 1, represents a top view, and Fig. 2, a side elevation of my improved saw set.

In the same A denotes a small inclined bed or anvil on which the tooth of the saw is made to rest while being bent into an angle with the blade. From this bed a handle B, or hand rest extends out in one direction while an arm C, is made to project in the opposite direction all as seen in the drawings. Through the said arm a screw D, is passed and screwed into a block E, which is made to project from the middle part of a long bar F, extending at right angles to the handle B. Another or rest screw G, is screwed downward into the arm C. It is for the purpose of supporting in conjunction with the bed A, the plate of the saw. A third screw H, passes upward through the end of the arm.

Another curved arm I, is made to extend from the handle and over the bed A, and to carry a screw K, which passes downward through the front end of said arm and between the bed A, and the rest screw G. This screw K, when turned down upon the saw plate, presses it firmly down upon the bed A, and the top of the screw G, and thereby prevents the saw plate from rising when a tooth of it is set or bent on the bed. The tooth is bent by the operation of a spring lever L, on the tooth as it lies on or over the inclined bed. The said lever is jointed to the bed A, and handle B, that is to say it passes and works through the handle B, and turns up and down on a fulcrum or pin M, which extends through both handle and lever. The short arm *b*, of the lever is bent over the bed, and works in conjunction with it, as the jaws of a pair of pincers or pliers. A spring N, is affixed to the underside of the handle B, and rests or acts at its other end against the lever L, as seen in the drawings.

O, and P, are two slides which pass through the bar F, and are confined in position respectively by set screws Q R. They serve to support the saw blade or keep it level, the said saw blade being made to rest upon them, the screw G, and the bed A, as denoted by red lines in the drawings. When placed on the bed the teeth adjoining that tooth of the saw which may rest on the bed, are made to abut against two gages or projections S, T, respectively arranged on opposite sides of the bed A, as seen in the drawings.

The common saw set is made with a lever or punch to be driven down upon the saw tooth by the blow of a hammer. The effect of concussion is such upon the particles of steel of which the saw may be made as to often cause a tooth to break, thereby either ruining or greatly injuring the saw.

My saw set acts by direct pressure, and not by the blow of a hammer, although in this respect I lay no claim of invention, as a saw set composed of a bent lever and bed or anvil has been used before, the said lever being forced down upon the bed by the hand applied to one arm of it. The said saw set however according to my knowledge was not constructed with a handle or bearing rest B, extending back from its bed A, and for the purpose of supporting the palm of the hand while the fingers operated the lever.

In my improved saw set the strain produced in setting or bending a tooth, is taken on the handle B, the bed A, and the spring lever, and does not operate or bear in such manner on the arm C, as to loosen the screw or whatever confines it to the block E.

To use my saw set the handle B, and the spring lever are grasped by the hand, so as to bring the palm to rest on the handle, and the fingers under the spring lever. By closing the fingers toward the palm, the lever will be lifted, and will force the jaw *b*, down upon or toward the inclined bed, whose upper surface should be arranged at such an angle with the plane of the saw as to give to the tooth the required inclination.

What I claim therefore as my invention, is—

The improved organization above described, or in other words the hand rest or handle B, the arm I, and screw K, the spring lever L, the jaws or bed A, and jaw *b*, of the lever L, the adjustable bed screw and arm C, in combination, the whole being constructed and made to operate together substantially as specified.

In testimony whereof I have hereto set my signature, this twenty first day of April A. D. 1848.

JACOB MUZZY.

Witnesses:
  LAWSON WOODBURY,
  AMOS RICHE.